(12) United States Patent
Swann

(10) Patent No.: US 12,203,574 B2
(45) Date of Patent: Jan. 21, 2025

(54) UNIVERSAL AND HEIGHT ADJUSTABLE DRAIN ADAPTOR

(71) Applicant: Brian Swann, Oceanside, CA (US)

(72) Inventor: Brian Swann, Oceanside, CA (US)

( * ) Notice: Subject to any disclaimer, the term of this patent is extended or adjusted under 35 U.S.C. 154(b) by 215 days.

(21) Appl. No.: 17/517,581

(22) Filed: Nov. 2, 2021

(65) Prior Publication Data

US 2023/0135546 A1    May 4, 2023

(51) Int. Cl.
*F16L 25/14*    (2006.01)
*E03C 1/12*    (2006.01)

(52) U.S. Cl.
CPC ............... *F16L 25/14* (2013.01); *E03C 1/12* (2013.01)

(58) Field of Classification Search
CPC ............ F16L 25/14; E03C 1/12; E03F 5/0408
USPC .............. 4/613, 695, 252.1, 252.6, 286, 288
See application file for complete search history.

(56) References Cited

U.S. PATENT DOCUMENTS 9,790,693 B2 * 10/2017 Wilde .................... E03F 5/0408
10,758,093 B2 * 9/2020 Ruiz Perez ........... E03F 5/0408

* cited by examiner

*Primary Examiner* — Tuan N Nguyen
(74) *Attorney, Agent, or Firm* — John D. Tran; Rhema Law Group

(57) ABSTRACT

A universal and height adjustable drain adaptor and methods of manufacture can include: a bonding flange; and a collapsible base coupled to the bonding flange, the collapsible base including folds and a bottom portion, the collapsible base configured to collapse about the folds to provide an extended configuration and a collapsed configuration, the extended configuration includes the bonding flange being further from the bottom portion than the collapsed configuration, and the bonding flange and the collapsible base create a universal drain adaptor with the bottom portion configured to be clamped between a drain base and a clamping ring.

20 Claims, 9 Drawing Sheets

UNIVERSAL AND HEIGHT ADJUSTABLE DRAIN ADAPTOR

TECHNICAL FIELD

This disclosure relates to drains, more particularly to universal and height adjustable drain adaptors for drains.

BACKGROUND

In the tile industry, the traditional drain is the three-piece, clamping ring drain. The traditional drain is typically installed by a plumber without regard to the type of waterproofing membrane the subsequent contractor will need to adapt the traditional drain to. The traditional drain is designed to be used with the older shower pan liner and not the topical, bonded waterproofing membranes in use today. The topical, bonded waterproofing membranes are typically a liquid or fluid applied membrane or a topical sheet type membrane. The subsequent contractor is limited to the types of membranes that can be used with the traditional drain and would be required to manipulate a mortar bed to provide the necessary adaption.

The traditional approach, however, is laborious, only works for fifty percent of the newer waterproofing membranes on the market, and have problems including proper bonding of the membrane and difficulty accommodating height variations. The traditional drain requires a membrane to be clamped between a drain base and a clamping ring. A mortar bed is formed above the membrane. Alternatively, the mortar bed is formed and manipulated to accommodate the topical, bonded waterproofing membranes that need to be applied over the mortar bed but still tied into the bottom base of the traditional drain. The traditional drain allows for height adjustment in the drain grate only while the bonding surface for the water proofing membrane remains in a fixed position at the bottom of the traditional drain.

The manufacturers of the membranes that do not work for this adaptation of the mortar bed have developed a flashing collar to make the connection between the traditional drain base and a membrane; however, these collars provide only a single height with no adjustment options and still require a laborious manipulation of the mortar bed. If different heights are desired a different membrane must be used.

Other solutions include bonding flange drains utilizing topical waterproof membranes. In these flange drains, a waterproof membrane is incorporated on a top surface of the flange. The flange drains can eliminate weep holes and provide a topical bonding surface rather than the traditional, bonding underneath a mortar bed.

Utilizing a flange drain requires the flange drain to be tied directly to the pluming waste pipe of the traditional drain. One solution is to use a fixed metal, silicone, plastic, or rubber flange which bolts onto the traditional drain base, to which it provides a seal and further contacts the flange drain.

One problem with this type of flange drain is that the flange drain requires a different grate and the traditional drain hardware cannot be used. This increases costs and restricts the options available during a project.

These previous solutions are typically designed and manufactured to work with specific types of shower pans. The drains are generally not cross-compatible between shower pans whether the traditional drain or the flange drain.

Solutions have been long sought but prior developments have not taught or suggested any complete solutions, and solutions to these problems have long eluded those skilled in the art. Thus, there remains a considerable need for devices and methods that can provide a height adjustable topical seal.

SUMMARY

A universal and height adjustable drain adaptor and methods of manufacturing, providing a height adjustable topical seal, are disclosed. The universal drain adaptor and methods can include: a bonding flange; and a collapsible base coupled to the bonding flange, the collapsible base including folds and a bottom portion, the collapsible base configured to collapse about the folds to provide an extended configuration and a collapsed configuration, the extended configuration includes the bonding flange being further from the bottom portion than the collapsed configuration, and the bonding flange and the collapsible base create a universal drain adaptor with the bottom portion configured to be clamped between a drain base and a clamping ring.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The universal drain adaptor is illustrated in the figures of the accompanying drawings which are meant to be exemplary and not limiting, in which like reference numerals are intended to refer to like components, and in which.

DETAILED DESCRIPTION

Figure 1:
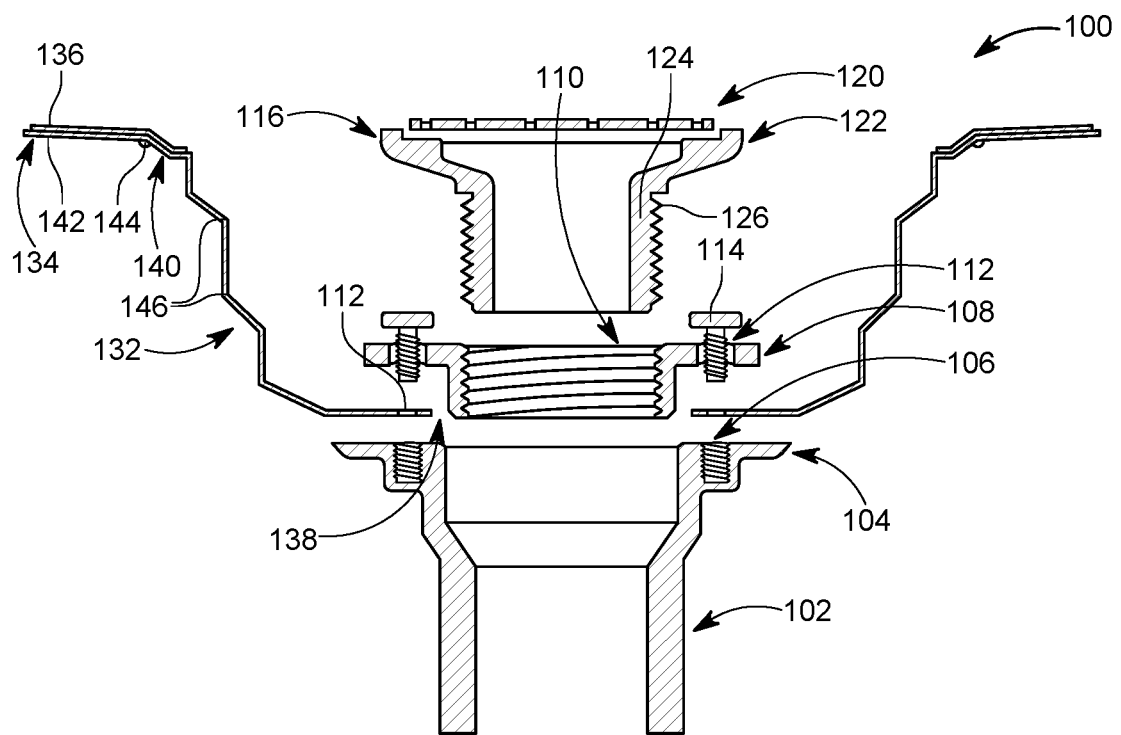
FIG. 1 is an exploded cross-sectional view of the universal drain adaptor in a first embodiment and in an extended configuration.

In the following description, reference is made to the accompanying drawings that form a part hereof, and in which are shown by way of illustration, embodiments in which the universal and height adjustable drain adaptor may be practiced. It is to be understood that other embodiments may be utilized and structural changes may be made without departing from the scope of the universal drain adaptor.

When features, aspects, or embodiments of the universal drain adaptor are described in terms of steps of a process, an operation, a control flow, or a flow chart, it is to be understood that the steps can be combined, performed in a different order, deleted, or include additional steps without departing from the universal drain adaptor as described herein.

The universal drain adaptor is described in sufficient detail to enable those skilled in the art to make and use the universal drain adaptor and provide numerous specific details to give a thorough understanding of the universal drain adaptor; however, it will be apparent that the universal drain adaptor may be practiced without these specific details. As used herein the term "couple" as in coupled or coupling means a direct or indirect physical contact between components. The term "universal" as in "universal drain adaptor" or "universal and height adjustable drain adaptor" means that a collapsible base of the universal component can allow for bolt through holes to be cut therethrough and in different locations in order to accommodate a bolt pattern of a drain base.

In order to avoid obscuring the universal drain adaptor, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGS.

Referring now to FIG. 1, therein is shown an exploded cross-sectional view of the universal drain adaptor 100 in a first embodiment and in an extended configuration. The universal drain adaptor 100 is shown coupled to a drain base 102.

The drain base 102 can include a drain base flange 104 having drain base threads 106. The drain base 102 can be coupled to a clamping ring 108.

The clamping ring 108 can include barrel receiving threads 110 and bolt through holes 112. The clamping ring 108 can be affixed to the drain base 102 with bolts 114 extending through the bolt through holes 112 and mated with the drain base threads 106 within the drain base 102.

The clamping ring 108 can be coupled to a head adapter 116. The head adapter 116 can include a grate 120 a grate platform 122 and an adjustment barrel 124.

The adjustment barrel 124 can include adjustment threads 126. The adjustment threads 126 can couple with the barrel receiving threads 110 for providing adjustment through rotation of the adjustment barrel 124. The head adapter 116 can be adjusted up or down relative to the drain base 102.

The drain base 102 can be coupled to the clamping ring 108 with the universal drain adaptor 100, sandwiched therebetween. The universal drain adaptor 100 can create a watertight seal between the drain base 102 and the clamping ring 108.

The universal drain adaptor 100 can include a collapsible base 132 and a bonding flange 134. The collapsible base 132 can be flexible and compressible. The collapsible base 132 can be formed of silicone, rubber, or plastic. The bonding flange 134 can be formed of ABS plastic and can include a bonding flange liner 136 covering a top surface of the bonding flange 134. The bonding flange liner 136 can be a polyethylene fleece adhered to the top surface of the bonding flange 134. When referring to "ABS plastic," it is understood that any similarly situated material can be used as well.

The collapsible base 132 can provide a low cost and flexible height adjustment between the drain base 102 and the bonding flange 134. The bonding flange 134 further provides a large topical seal for a topical waterproofing membrane, whether it is liquid or sheet.

The collapsible base 132 can further accommodate the bolt through holes 112 and a barrel through hole 138 where needed based on the specific drain manufacturers drain design. The bolt through holes 112 can allow the bolts 114 to extend through the collapsible base 132 and into the drain base threads 106. The barrel through hole 138 can allow the adjustment barrel 124 to extend through the collapsible base 132 and mate with the barrel threads 110 within the drain base 102. This connection and accommodation is performed in the field as needed by cutting the bolt through holes 112 and the barrel through hole 138 into the collapsible base 132.

The bonding flange 134 can extend with an angled extension 140, away from the collapsible base 132. For example, the angled extension 140 can extend level near the collapsible base 132 and then angle up to extend at a forty-five degree angle toward a flange 142 of the bonding flange 134.

The flange 142 can be substantially flat but should also be angled slightly toward the head adapter 116. The bonding flange liner 136 can contact the angled extension 140 and most of the flange 142 leaving only a small periphery of the bonding flange 134 exposed from the bonding flange liner 136.

Some contemplated embodiments can include an additional sealant 144 for sealing the bonding flange 134 of the universal drain adaptor 100. Other embodiments contemplate the collapsible base 132 and the bonding flange 134 being formed integrally with the collapsible base 132 being molded to the bonding flange 134 and without the sealant 144.

The universal drain adaptor 100 can collapse or fold along folds 146 within the collapsible base 132. The folds 146 can allow the collapsible base 132 to fold into itself, collapsing the collapsible base 132 and decreasing the distance between the bonding flange 134 and the drain base 102.

It is contemplated that the folds 146 could be configured to provide quarter inch increments. That is, the folds 146 can be spaced so as to allow the collapsible base 132 to fold or collapse a quarter inch at a time, which provides a high degree of flexibility in vertical placement and provides the easy ability to follow shower pan minimum slope guidelines and requirements.

Figure 2:
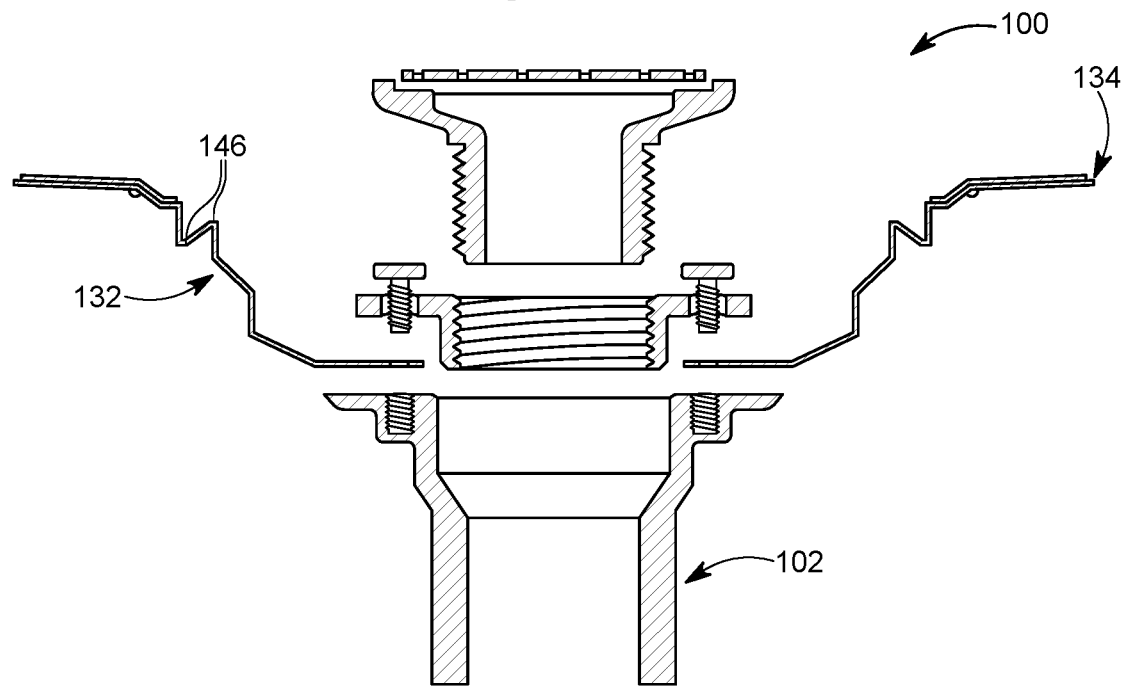
FIG. 2 is an exploded cross-sectional view of the universal drain adaptor of FIG. 1 in a collapsed configuration.

Referring now to FIG. 2, therein is shown an exploded cross-sectional view of the drain adaptor 100 of FIG. 1 in a collapsed configuration. The drain adaptor 100 is shown collapsed about the folds 146. The folds 146 allow the collapsible base 132 to fold into itself, collapsing the collapsible base 132 and decreasing the distance between the bonding flange 134 and the drain base 102. The collapsible base is shown to further include a first fold side and a second fold side. The first fold side is depicted nearer the bonding flange 134 with respect to the second fold side, and the first fold side and the second fold side extended directly from one of the folds 146 and vertically away from the fold 146 and the bonding flange 134. The collapsed configuration is depicted to include the first fold side, the second fold side, and the fold 146 within a vertical perimeter defined by an inner edge of the bonding flange 134. The collapsed configuration is further depicted to include the first fold side and the second fold side extending downward from the fold.

Figure 3:
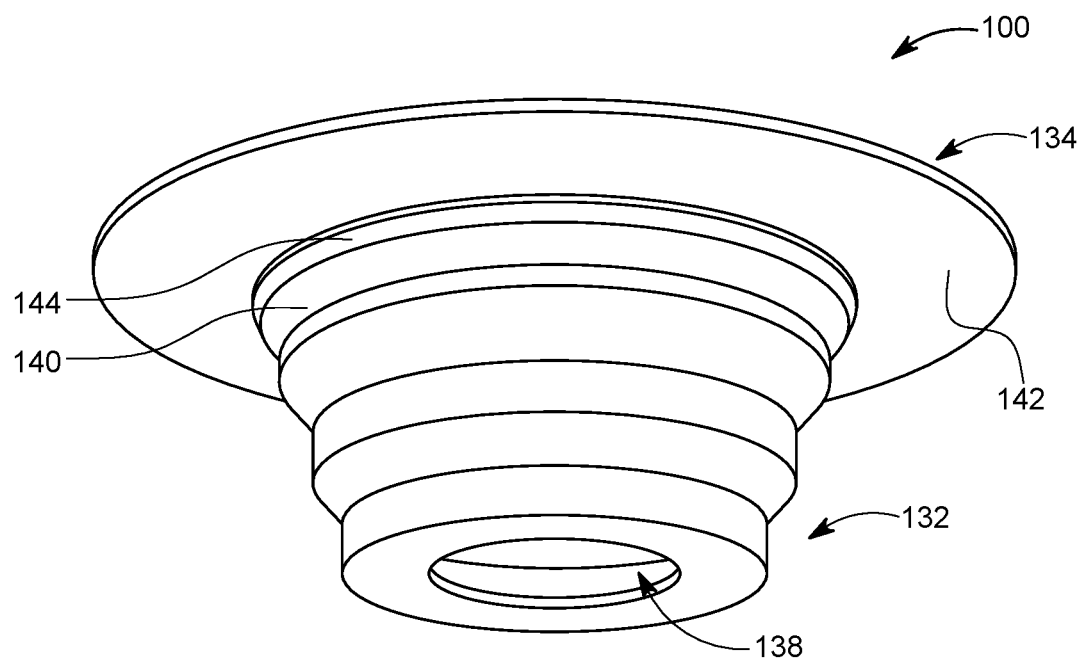
FIG. 3 is a front isometric view of the universal drain adaptor of FIG. 1.

Referring now to FIG. 3, therein is shown a front isometric view of the universal drain adaptor 100 of FIG. 1. The universal drain adaptor 100 is depicted having the collapsible base 132 and the bonding flange 134 coupled thereto. The collapsible base 132 can be flexible and compressible. The collapsible base 132 can be formed of silicone, rubber, or plastic. The bonding flange 134 can be formed of ABS plastic or any similarly-like material.

The collapsible base 132 can provide a low cost and flexible height adjustment between the drain base 102 and the bonding flange 134 both of FIG. 1. The bonding flange 134 further provides a large topical seal.

The collapsible base 132 can further include the bolt through holes 112 of FIG. 1 and the barrel through hole 138. The bolt through holes 112 can be formed with a punch or can be cut on site during an installation.

The bonding flange 134 can extend with the angled extension 140, away from the collapsible base 132. For example, the angled extension 140 can extend at a forty-five degree angle from the collapsible base 132.

The angled extension 140 can extend to the flange 142. The flange 142 can be substantially flat but should also be angled slightly toward the head adapter 116 of FIG. 1. The sealant 144 is depicted and, in some embodiments, can provide a seal between the collapsible base 132 and the bonding flange 134. Other embodiments contemplate the collapsible base 132 and the bonding flange 134 being formed integrally with the collapsible base 132 being molded to the bonding flange 134.

Figure 4:
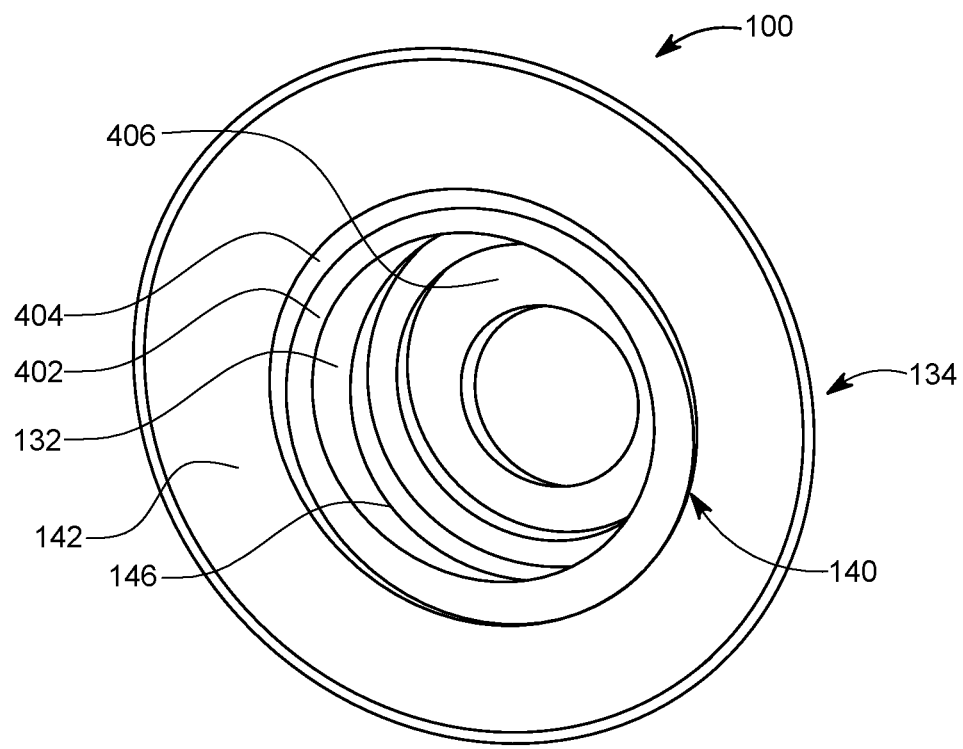
FIG. 4 is a top isometric view of the universal drain adaptor of FIG. 1.

Referring now to FIG. 4, therein is shown a top isometric view of the universal drain adaptor 100 of FIG. 1. The bonding flange 134 of the universal drain adaptor 100 is shown having the angled extension 140 between the flange 142 and the collapsible base 132.

The angled extension 140 can include an angled extension base 402 and an angled extension wall 404. The angled extension base can be substantially co-planar with the flange 142. The angled extension wall 404 can extend between the angled extension base 402 and the flange 142. The angled extension wall 404 can extend in an angle less than ninety degrees and is contemplated to be closer to forty-five degrees.

The folds 146 are shown forming rings around a bottom portion 406. The bottom portion is depicted having space for bolt through holes to be cut therethrough and in different locations in order to accommodate a bolt pattern of a drain base. Furthermore, space is depicted for cutting the barrel through hole, which is depicted cut out of the space of the bottom portion.

Figure 5:
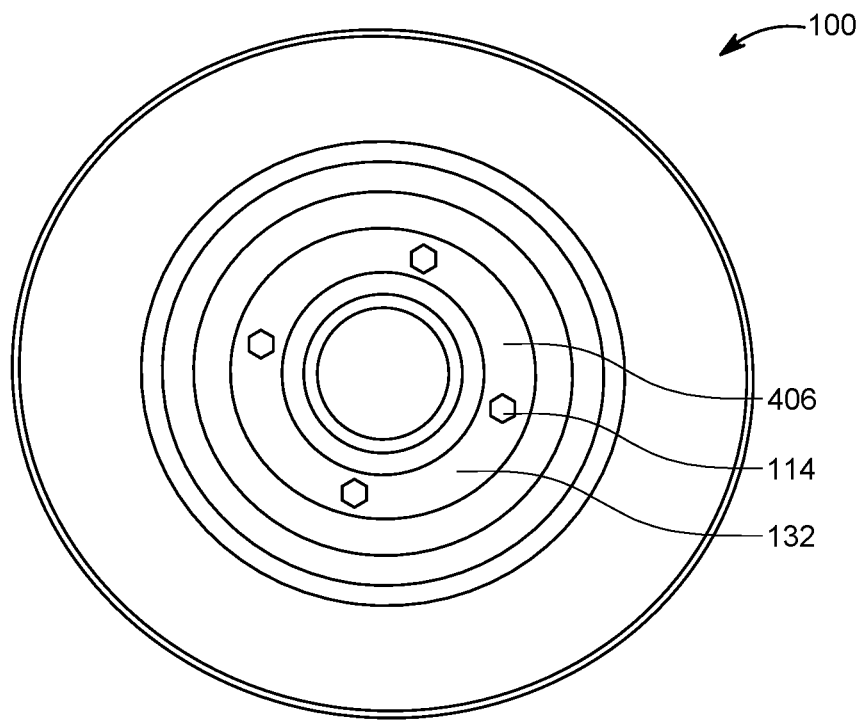
FIG. 5 is a top view of the universal drain adaptor of FIG. 1 in a bolting phase of installation.

Referring now to FIG. 5, therein is shown a top view of the universal drain adaptor 100 of FIG. 1 in a bolting phase of installation. The universal drain adaptor 100 is shown having the bolt through holes 112 of FIG. 1 formed within the collapsible base 132.

The bolts 114 have been threaded through the bolt through holes 112 and into the drain base threads 106 of the drain base 102, both of FIG. 1. The bolt through holes 112 can be formed or cut within a bottom portion 406 of the collapsible base 132. The bottom portion 406 of the collapsible base 132 can be substantially co-planar with the drain base flange 104 and the clamping ring 108, both of FIG. 1, for providing a watertight seal between the universal drain adaptor 100 and the drain base 102.

Figure 6:
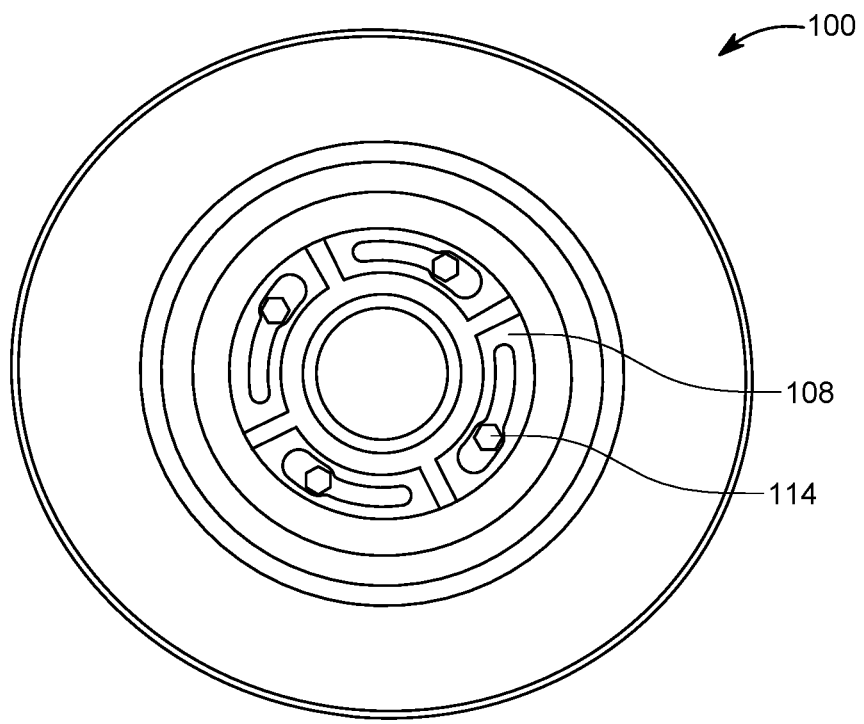
FIG. 6 is a top view of the universal drain adaptor of FIG. 1 in a locking phase of installation.

Referring now to FIG. 6, therein is shown a top view of the universal drain adaptor 100 of FIG. 1 in a locking phase of installation. The clamping ring 108 is depicted as installed on the bolts 114 and sandwiching the collapsible base 132 between the clamping ring 108 and the drain base 102 of FIG. 1.

Figure 7:
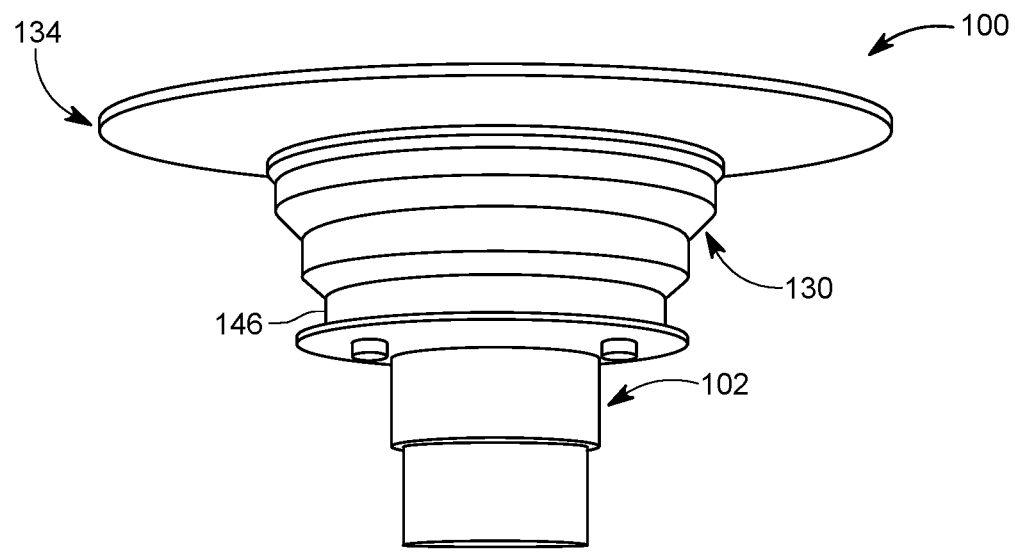
FIG. 7 is a side view of the universal drain adaptor of FIG. 1 in a collapsed configuration.

Referring now to FIG. 7, therein is shown a side view of the universal drain adaptor 100 of FIG. 1 in a collapsed configuration. The universal drain adaptor 100 can be seen collapsed about the folds 146. The folds 146 allow the collapsible base 132 to fold into itself, collapsing the collapsible base 132 and decreasing the distance between the bonding flange 134 and the drain base 102.

Figure 8:
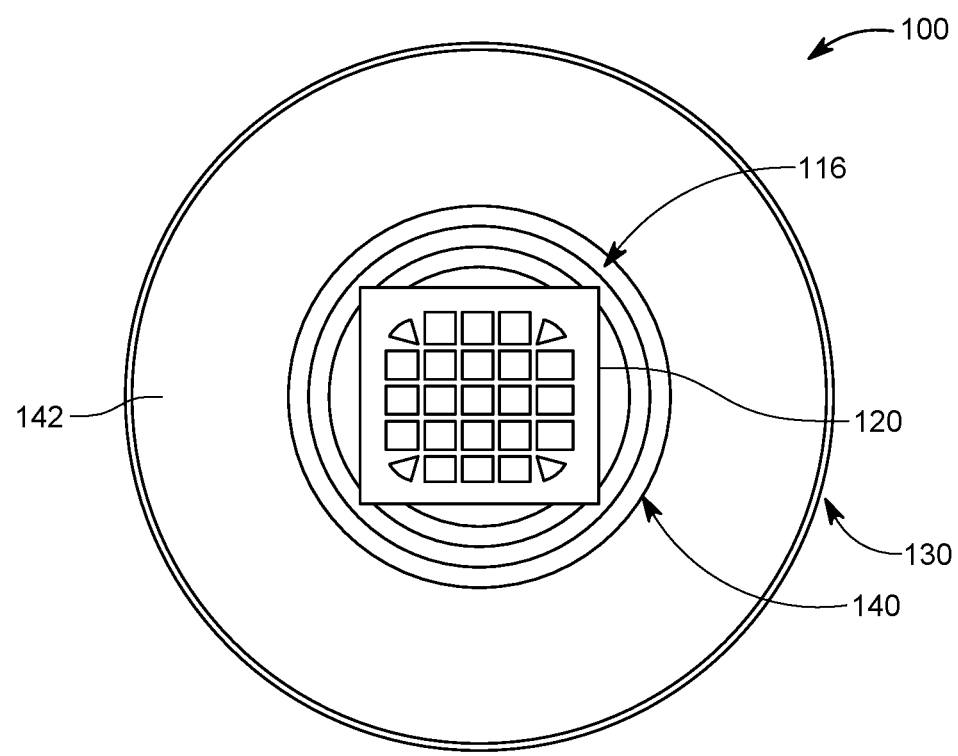
FIG. 8 is a top view of the universal drain adaptor of FIG. 1 in a grate adjustment phase of installation.

Referring now to FIG. 8, therein is shown a top view of the universal drain adaptor 100 of FIG. 1 in a grate adjustment phase of installation. The head adapter 116 is depicted as centered in the universal drain adaptor 100 with the grate 120 between the angled extension 140 and substantially flush with the flange 142. Alternatively, it is contemplated that the grate 120 of the head adapter 116 could be positioned slightly above or below the flange 142 while fitting in-between the angled extension 140.

Figure 9:
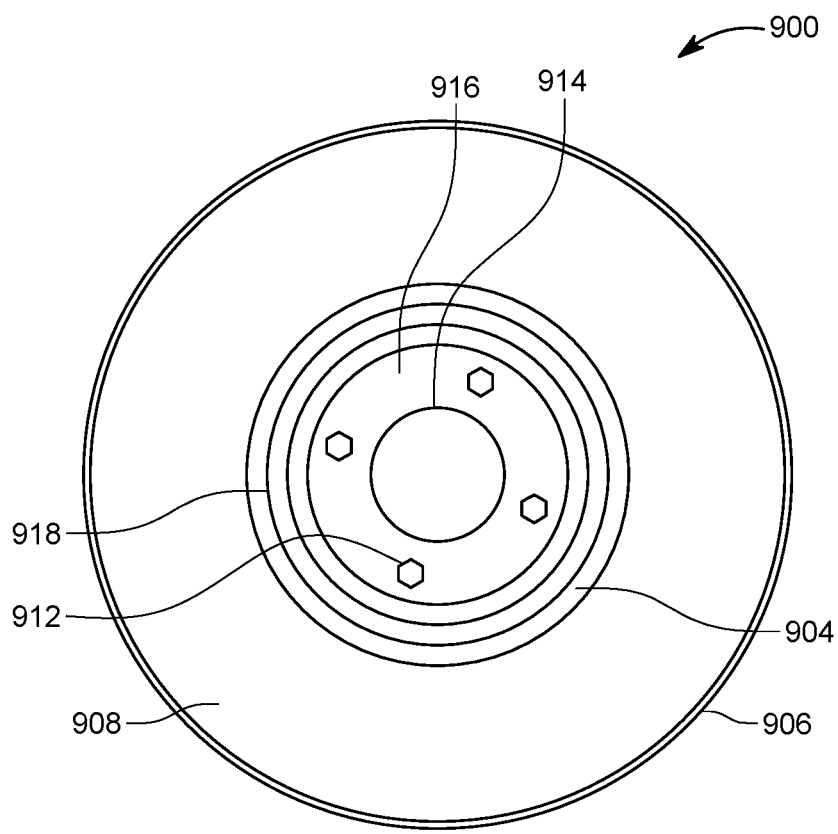
FIG. 9 is a top view of a universal drain adaptor of the universal drain adaptor in a second embodiment.

Referring now to FIG. 9, therein is shown a top view of a universal drain adaptor 900 in a second embodiment. The universal drain adaptor 900 can include a collapsible base 904 and a bonding flange 906. The collapsible base 904 can be flexible and compressible. The collapsible base 904 can be formed of silicone, rubber, or plastic. The bonding flange 906 can be formed of ABS plastic and can include a bonding flange liner 908 covering a top surface of the bonding flange 906. The bonding flange liner 908 can be a polyethylene fleece adhered to the top surface of the bonding flange 906.

The diameter of the bonding flange 906 can be ten and a half inches in a first size and eight and a half inches in a second size. The width of the top surface of the bonding flange 906, to which the bonding flange liner 908 is adhered, can be 2 inches in both the first and second sizes.

The collapsible base 904 can further include bolt through holes 912 and a barrel through hole 914 formed in a bottom portion 916.

The top surface of the bonding flange 906 can be a tray and formed substantially flat. The bonding flange liner 908 can contact the bonding flange 906 leaving only a small periphery of the bonding flange 906 exposed from the bonding flange liner 908. The small periphery may also include a mortar locking design integrated into the edge of the bonding flange 906.

The drain adaptor 900 can collapse or fold along folds 918 within the collapsible base 904. The folds 918 can allow the collapsible base 904 to fold into itself, collapsing the collapsible base 904 and decreasing the distance between the bonding flange 906 and the bottom portion 916. The collapsed configuration is depicted including the folds 918 extended vertically closer to the bonding flange 906 and vertically further from the bottom portion of the collapsible base 904 relative to the fold 918 in the extended configuration, which are shown for example in FIGS. 10 and 11.

It is contemplated that the folds 918 could be configured to provide quarter inch increments. That is, the folds 918 can be spaced so as to allow the collapsible base 904 to fold or collapse a quarter inch at a time, which provides a high degree of flexibility in vertical placement.

Figure 10:
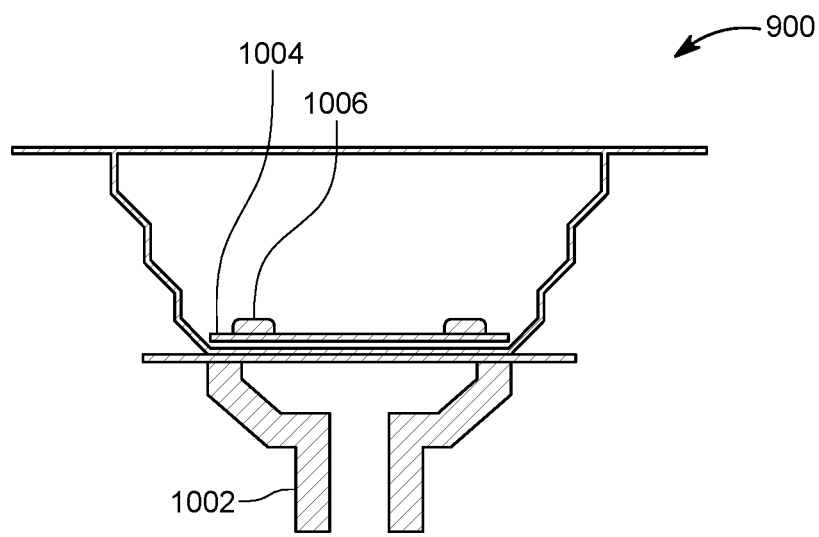
FIG. 10 is a cross-sectional view of the universal drain adaptor of FIG. 9 in a locking phase of installation.

Referring now to FIG. 10, therein is shown a cross-sectional view of the universal drain adaptor 900 of FIG. 9 in a locking phase of installation. The universal drain adaptor 900 is shown coupled to a drain base 1002, which can be coupled to a clamping ring 1004 with the universal drain adaptor 900 sandwiched therebetween. The universal drain adaptor 900 can create a watertight seal between the drain base 1002 and the clamping ring 1004.

The collapsible base 904 can provide a low cost and flexible height adjustment between the drain base 1002 and the bonding flange 906. The bonding flange 906 further provides a large topical seal.

The clamping ring 1004 can be held to the drain base 1002 with bolts 1006 extended through the clamping ring 1004, through the bottom portion 916 of the collapsible base 904, and into the drain base threads.

Figure 11:
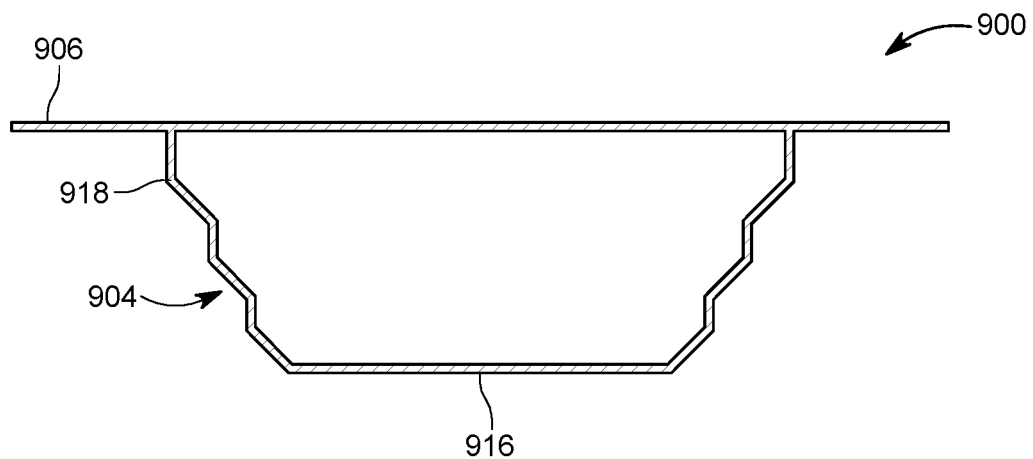
FIG. 11 is a cross-sectional view of the universal drain adaptor of FIG. 9 in an extended configuration.

Referring now to FIG. 11, therein is shown a cross-sectional view of the universal drain adaptor 900 of FIG. 9 in an extended configuration. The universal drain adaptor 900 is depicted having the collapsible base 904 and the bonding flange 906 coupled thereto. The collapsible base 904 can be flexible and compressible. The collapsible base 904 can be formed of silicone, rubber, or plastic. The bonding flange 906 can be formed of ABS plastic.

The collapsible base 904 can provide a low cost and flexible height adjustment between the bottom portion 916 near the drain base 1002, of FIG. 10, and the bonding flange 906. The bonding flange 906 further provides a large topical seal.

The collapsible base 904 can have the bottom portion 916 without the bolt through holes 912 and the barrel through hole 914, both of FIG. 9, so that they can be cut out on the job site to the exact dimensions needed.

The bottom portion 916 can measure six and seven eighths inches in the first size of FIG. 9 and four and seven eighths inches in the second size of FIG. 9. When in the fully extended configuration the bottom portion 916 can be three inches from the bonding flange 906. The collapsible base 904 can collapse about the folds 918 in quarter inch increments.

Figure 12:
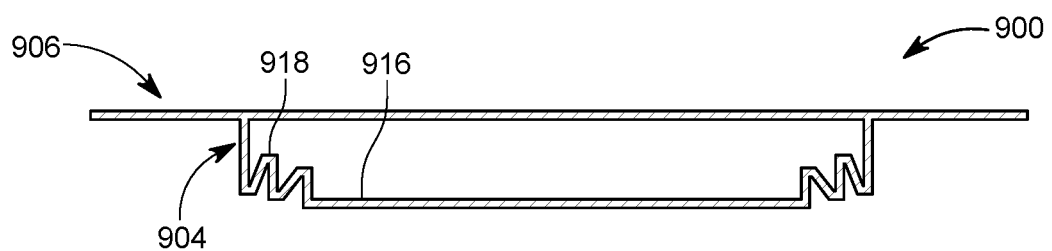
FIG. 12 is a cross-sectional view of the universal drain adaptor of FIG. 9 in a collapsed configuration.

Referring now to FIG. 12, therein is shown a cross-sectional view of the universal drain adaptor 900 of FIG. 9 in a collapsed configuration. The universal drain adaptor 900 is depicted having the collapsible base 904 and the bonding flange 906 coupled thereto. The collapsible base 904 can provide a low cost and flexible height adjustment between the bottom portion 916 near the drain base 1002, of FIG. 10, and the bonding flange 906. When in the fully retracted configuration the bottom portion 916 can be one half an inch from the bonding flange 906.

The collapsible base 904 can collapse about the folds 918 in quarter inch increments. The folds 918 can be seen collapsed and folded in rings around the bottom portion 916.

Figure 13:
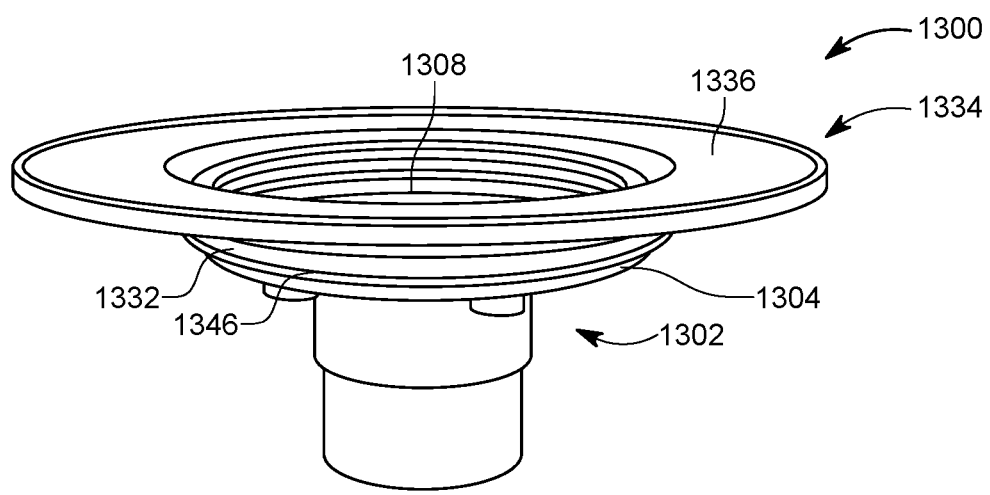
FIG. 13 is an isometric view of the universal drain adaptor in a collapsed configuration and in a third embodiment.

Referring now to FIG. 13, therein is shown an isometric view of the universal drain adaptor 1300 in a collapsed configuration and in a third embodiment. The universal drain adaptor 1300 is shown coupled a drain base 1302.

The drain base 1302 can include a drain base flange 1304 and can be coupled to a clamping ring 1308, a head adapter including a grate, and an adjustment barrel having adjustment threads. The adjustment threads allowing the head adapter to be adjusted up or down relative to the drain base in a way similar to that of the first embodiment of FIG. 1.

The drain base 1302 can be coupled to the clamping ring 1308 with the universal drain adaptor 1300 sandwiched therebetween. The universal drain adaptor 1300 can create a watertight seal between the drain base 1302 and the clamping ring 1308.

The universal drain adaptor 1300 can include a collapsible base 1332, and a bonding flange 1334. The collapsible base 1332 can be flexible and compressible. The collapsible base 1332 can be formed of silicone, rubber, or plastic. The bonding flange 1334 can be formed of ABS plastic and can include a bonding flange liner 1336 covering a top surface of the bonding flange 1334. The bonding flange liner 1336 can be a polyethylene fleece adhered to the top surface of the bonding flange 1334.

The collapsible base 1332 can provide a low cost and flexible height adjustment between the drain base 1302 and the bonding flange 1334. The bonding flange 1334 further provides a large topical seal for a topical waterproofing membrane, whether it is liquid or sheet.

Figure 16:
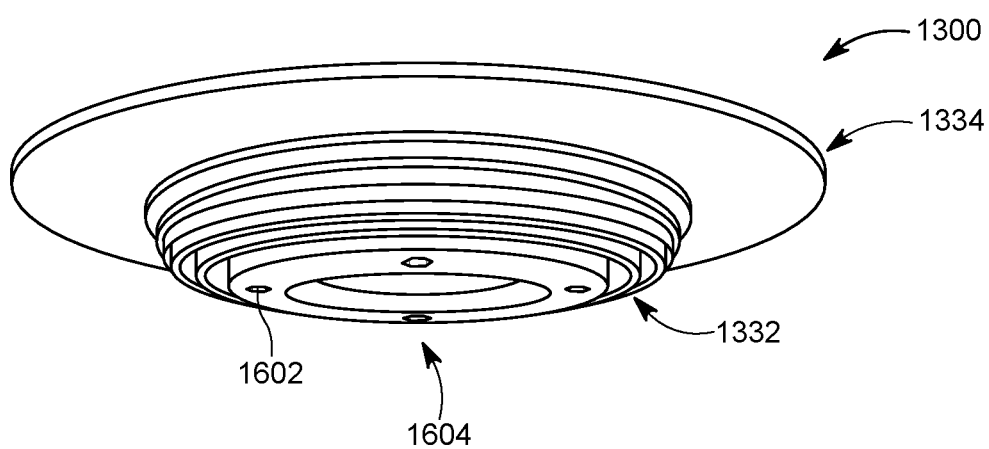
FIG. 16 is an isometric view of the universal drain adaptor of FIG. 13 in a collapsed configuration.

The collapsible base 1332 can further accommodate the bolt through holes 1602 and a barrel through hole 1604, both more clearly shown in FIG. 16. The bolt through holes 1602 and the barrel through hole 1604 can be cut into the collapsible base 1332 where needed, based on the specific drain manufacturers drain design. The bolt through holes can allow bolts to extend through the collapsible base 1332 and into threads of the drain base 1302. The bolt through holes can be cut into the collapsible base 1332 during installation in the field as needed in order to adapt to any drain base 1302.

The third embodiment of FIGS. 13-17 depict the bonding flange 1334 being formed integrally as a single molded piece and without sealant, for example the additional sealant 144 of FIG. 1. Furthermore the bonding flange 1334 can be integrally formed with the collapsible base 1332 being molded to the bonding flange 1334.

The universal drain adaptor 1300 can collapse or fold along folds 1346 within the collapsible base 1332. The folds 1346 can allow the collapsible base 1332 to fold into itself, collapsing the collapsible base 1332 and decreasing the distance between the bonding flange 1334 and the drain base 1302.

It is contemplated that the folds 1346 could be configured to provide quarter inch increments. That is, the folds 1346 can be spaced so as to allow the collapsible base 1332 to fold or collapse a quarter inch at a time, which provides a high degree of flexibility in vertical placement and provides the easy ability to follow shower pan minimum slope guidelines and requirements.

Figure 14:
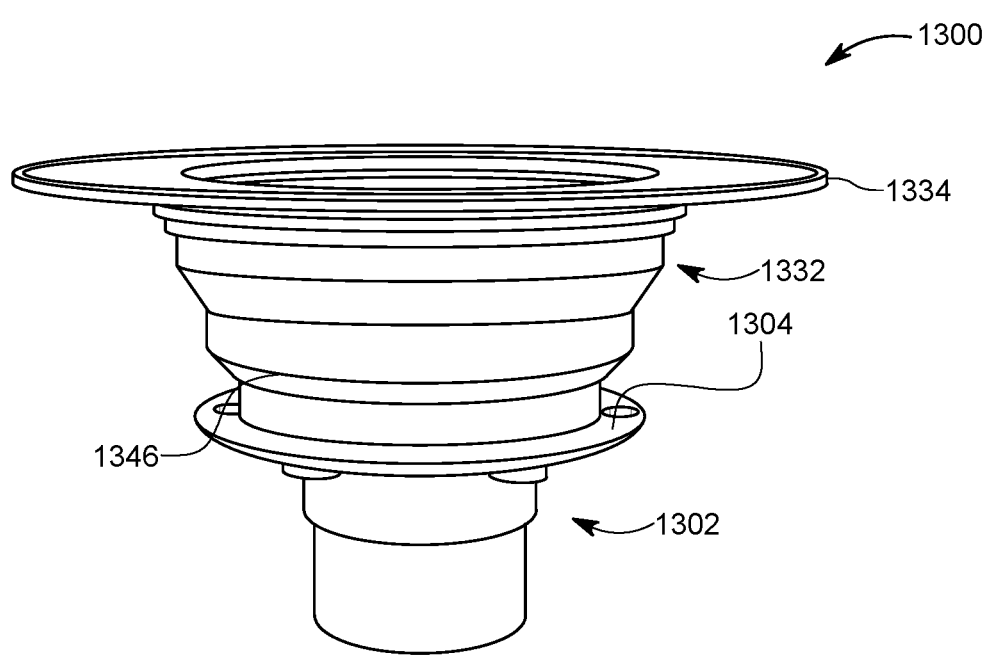
FIG. 14 is an isometric view of the universal drain adaptor of FIG. 13 in an extended configuration.

Referring now to FIG. 14, therein is shown an isometric view of the universal drain adaptor 1300 of FIG. 13 in an extended configuration. The universal drain adaptor 1300 is shown coupled a drain base 1302.

The drain base flange 1304 of the drain base 1302 is more clearly shown in the extended configuration in FIG. 14. The universal drain adaptor 1300 can extend when the folds 1346 of the collapsible base 1332 are unfolded. The extended configuration provides the most distance between the bonding flange 1334 and the drain base 1302 that is provided by the universal drain adaptor 1300 of the universal drain adaptor 1300. Thus, the collapsible base 1332 and the bonding flange 1334 of the universal drain adaptor 1300 provide a universal height adjustment for the drain base 1302.

Figure 15:
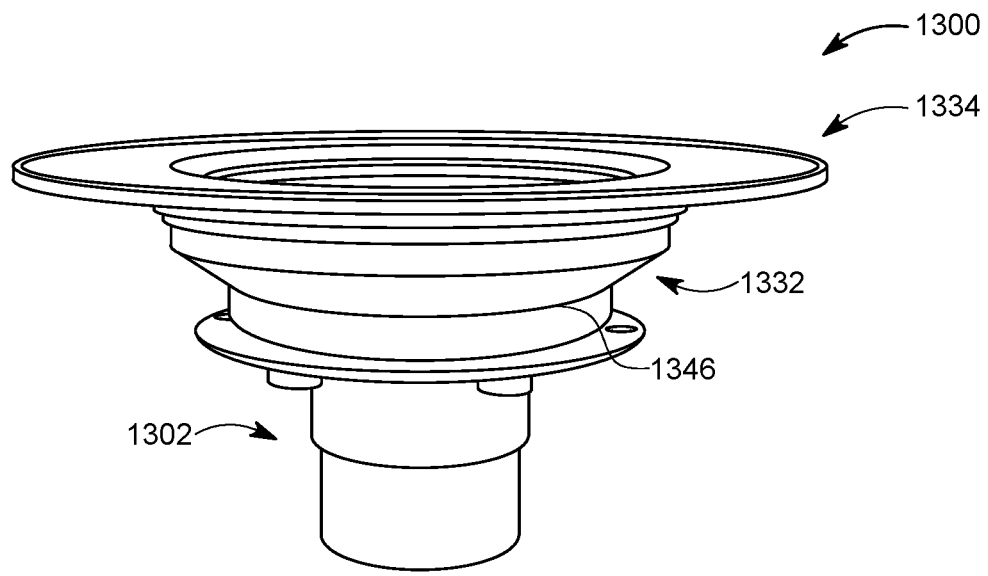
FIG. 15 is an isometric view of the universal drain adaptor of FIG. 13 in a partially extended configuration.

Referring now to FIG. 15, therein is shown an isometric view of the universal drain adaptor 1300 of FIG. 13 in a partially extended configuration. The universal drain adaptor 1300 is shown coupled a drain base 1302. The universal drain adaptor 1300 can extend when the folds 1346 of the collapsible base 1332 are unfolded and collapse when the folds 1346 are folded providing an intermediate distance between the bonding flange 1334 and the drain base 1302. Thus, the collapsible base 1332 and the bonding flange 1334 of the universal drain adaptor 1300 provide a universal height adjustment for the drain base 1302.

Referring now to FIG. 16, therein is shown an isometric view of the universal drain adaptor 1300 of FIG. 13 in a collapsed configuration. The universal drain adaptor 1300 is depicted to include the collapsible base 1332 and the bonding flange 1334, which are further depicted as formed as a single integral component.

The collapsible base 1332 can accommodate bolt through holes 1602 and a barrel through hole 1604 where needed based on the specific drain manufacturers drain design. The bolt through holes 1602 and the barrel through hole 1604 of the third embodiment are substantially similar to the bolt through holes 112 and the barrel through hole 138 of the first embodiment of FIG. 1.

Figure 17:
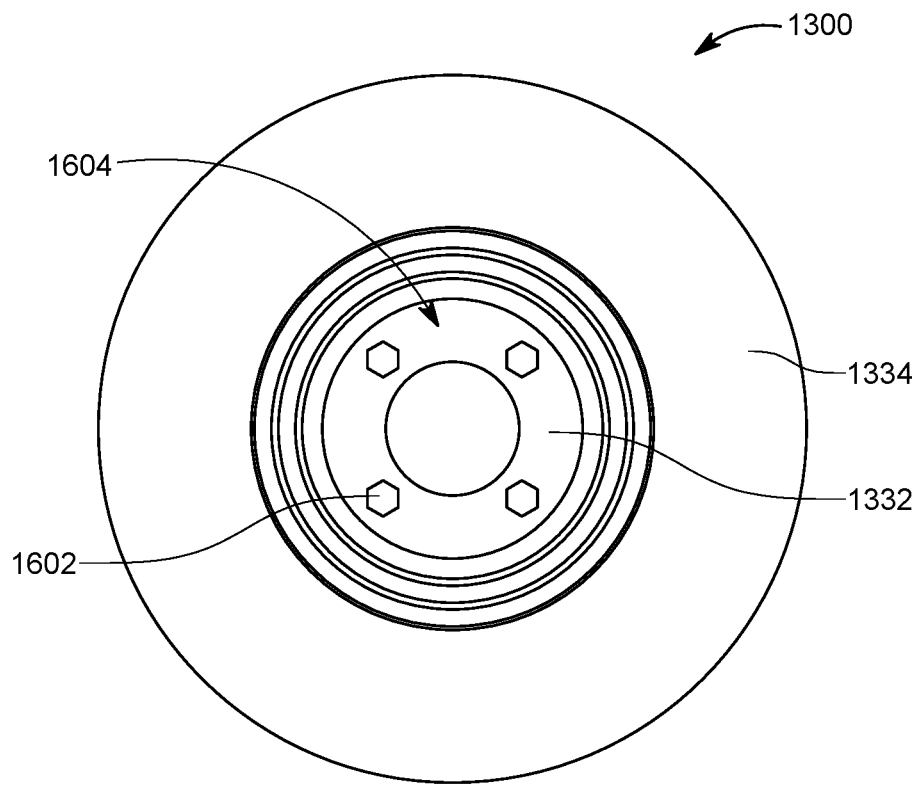
FIG. 17 is a bottom view of the universal drain adaptor of FIG. 13 in a collapsed configuration.

Referring now to FIG. 17, therein is shown a bottom view of the universal drain adaptor 1300 of FIG. 13 in a collapsed configuration. The universal drain adaptor 1300 is depicted to include the collapsible base 1332 and the bonding flange 1334, which are further depicted as formed as a single integral component. The collapsible base 1332 can accommodate bolt through holes 1602 and a barrel through hole 1604 where needed based on the specific drain manufacturers drain design.

Figure 18:
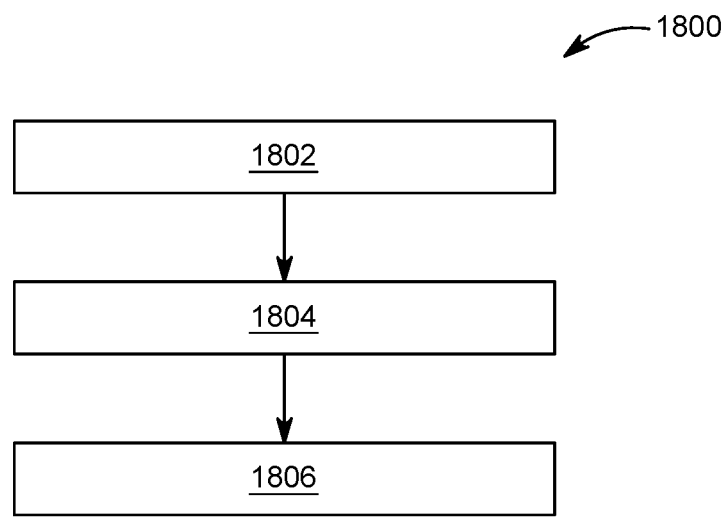
FIG. 18 is a method for manufacturing a universal drain adaptor of the present disclosure.

Referring now to FIG. 18, therein is shown a method for manufacturing a universal and height adjustable drain adaptor of the present disclosure. The method can include forming a bonding flange in a block 1302; affixing a bonding flange liner to a top surface of the bonding flange in a block 1304; and coupling a collapsible base to the bonding flange, the collapsible base including folds and a bottom portion, the collapsible base configured to collapse about the folds to provide an extended configuration and a collapsed configuration, the extended configuration includes the bonding flange being further from the bottom portion than the collapsed configuration, and the bonding flange and the collapsible base create a universal drain adaptor with the bottom portion configured to be clamped between a drain base and a clamping ring in a block 1306.

Thus, it has been discovered that the universal drain adaptor furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the universal drain adaptor has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A drain adaptor comprising:
   a bonding flange; and
   a collapsible base coupled to the bonding flange, the collapsible base including a fold, a first fold side, a second fold side, and a bottom portion, the collapsible base configured to collapse about the fold to provide an extended configuration and a collapsed configuration, the collapsed configuration including the first fold side, the second fold side, and the fold within a vertical perimeter defined by an inner edge of the bonding flange, the extended configuration includes the bonding flange being further from the bottom portion than the bonding flange is from the bottom portion in the collapsed configuration, and the bottom portion configured to be clamped between a drain base and a clamping ring.

2. The drain adaptor of claim 1 wherein the bonding flange is formed from ABS plastic.

3. The drain adaptor of claim 1 wherein the collapsible base is formed from silicone.

4. The drain adaptor of claim 1 wherein the collapsible base includes space for cutting a barrel through hole in the bottom portion and the barrel through hole for aligning with an adjustment barrel of a head adapter.

5. The drain adaptor of claim 1 wherein the collapsible base includes space for cutting a bolt through hole in the bottom portion and the bolt through hole for affixing the clamping ring to the drain base.

6. A drain adaptor comprising:
   a bonding flange;
   a bonding flange liner affixed to a top surface of the bonding flange; and
   a collapsible base coupled to the bonding flange, the collapsible base including a fold, a first fold side, a second fold side, and a bottom portion, the collapsible base configured to collapse about the fold to provide an extended configuration and a collapsed configuration, the collapsed configuration including the first fold side, the second fold side, and the fold within a vertical perimeter defined by an inner edge of the bonding flange, the collapsed configuration including the first fold side and the second fold side extending downward from the fold, the extended configuration includes the bonding flange being further from the bottom portion than the bonding flange is from the bottom portion in the collapsed configuration, and the bottom portion configured to be clamped between a drain base and a clamping ring.

7. The drain adaptor of claim 6 wherein the bonding flange liner is a polyethylene fleece adhered to the top surface of the bonding flange.

8. The drain adaptor of claim 6 wherein the drain adaptor is configured to extend from the bottom portion clamped to the drain base, up to the bonding flange being level with a grate of a head adapter.

9. The drain adaptor of claim 6 wherein the bonding flange includes a flange and an angled extension wall, the angled extension wall extended from the flange toward the bottom portion.

10. The drain adaptor of claim 6 wherein the fold forms a ring around the bottom portion.

11. A method of manufacturing a drain adaptor comprising:
   forming a bonding flange; and
   coupling a collapsible base to the bonding flange, the collapsible base including a fold, a first fold side, a second fold side, and a bottom portion, the collapsible base configured to collapse about the fold to provide an extended configuration and a collapsed configuration, the collapsed configuration including the first fold side, the second fold side, and the fold within a vertical perimeter defined by an inner edge of the bonding flange, the extended configuration includes the bonding flange being further from the bottom portion than the bonding flange is from the bottom portion in the collapsed configuration, and the bottom portion configured to be clamped between a drain base and a clamping ring.

12. The method of claim 11 wherein forming the bonding flange includes forming the bonding flange from ABS plastic.

13. The method of claim 11 wherein coupling the collapsible base includes coupling the collapsible base formed from silicone.

14. The method of claim 11 wherein coupling the collapsible base includes coupling the collapsible base having space for cutting a barrel through hole in the bottom portion and the barrel through hole for aligning with an adjustment barrel of a head adapter.

15. The method of claim 11 wherein coupling the collapsible base includes coupling the collapsible base having space for cutting a bolt through hole in the bottom portion and the bolt through hole for affixing the clamping ring to the drain base.

16. The method of claim 11 further comprising affixing a bonding flange liner to a top surface of the bonding flange.

17. The method of claim 16 wherein affixing the bonding flange liner includes affixing a polyethylene fleece adhered to the top surface of the bonding flange.

18. The method of claim 16 wherein coupling the collapsible base includes coupling the collapsible base configured to extend from the bottom portion clamped to the drain base, up to the bonding flange being level with a grate of a head adapter.

19. The method of claim 16 wherein forming the bonding flange includes forming a flange and an angled extension wall, the angled extension wall extended from the flange toward the bottom portion.

20. The method of claim 16 wherein coupling the collapsible base includes coupling the collapsible base having the fold forms a ring around the bottom portion.

* * * * *